United States Patent
Shin et al.

(10) Patent No.: US 12,279,199 B2
(45) Date of Patent: Apr. 15, 2025

(54) METHOD AND APPARATUS FOR SUPPORTING SERVICE CONTINUITY IN NPN USING NWDAF

(71) Applicant: ELECTRONICS AND TELECOMMUNICATIONS RESEARCH INSTITUTE, Daejeon (KR)

(72) Inventors: Myung Ki Shin, Seoul (KR); Jihoon Sung, Daejeon (KR); Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 402 days.

(21) Appl. No.: 17/714,226

(22) Filed: Apr. 6, 2022

(65) Prior Publication Data

US 2022/0322222 A1    Oct. 6, 2022

(30) Foreign Application Priority Data

Apr. 6, 2021 (KR) .................. 10-2021-0044862
Apr. 6, 2022 (KR) .................. 10-2022-0043045

(51) Int. Cl.
*H04W 36/00* (2009.01)
*H04W 48/18* (2009.01)
(Continued)

(52) U.S. Cl.
CPC ..... *H04W 48/18* (2013.01); *H04W 36/00226* (2023.05); *H04W 76/10* (2018.02); *H04W 84/042* (2013.01)

(58) Field of Classification Search
CPC . H04W 36/0022; H04W 48/18; H04W 76/10; H04W 84/042
See application file for complete search history.

(56) References Cited

U.S. PATENT DOCUMENTS 11,310,731 B1 *  4/2022  Feder ................. H04W 36/32
2014/0362822 A1  12/2014  Tseng et al.
(Continued)

FOREIGN PATENT DOCUMENTS

EP        3817284 A1     5/2021

OTHER PUBLICATIONS

3GPP, "3rd Generation Partnership Project; Technical Specification Group Services and System Aspects; Study on enhanced support of Non-Public Networks (NPN) (Release 17)" 3GPP TR 23.700-07 V17.0.0 (Mar. 2021).

(Continued)

*Primary Examiner* — Alpus Hsu
(74) *Attorney, Agent, or Firm* — LRK PATENT LAW FIRM (57) ABSTRACT

A method and an apparatus for supporting service continuity between a first network and a second network are provided, which include: requesting slice analytics for selection of a slice from a network data analytics function (NWDAF) of the first network before a terminal moves from the first network to the second network; and selecting a slice to be used in the second network to provide a service to the terminal based on the slice analytics received from the NWDAF of the first network.

18 Claims, 7 Drawing Sheets

(51) Int. Cl.
*H04W 76/10* (2018.01)
*H04W 84/04* (2009.01)

(56) References Cited

U.S. PATENT DOCUMENTS

| | | |
|---|---|---|
| 2020/0045559 A1* | 2/2020 | Kim .................. H04W 28/0268 |
| 2020/0196155 A1* | 6/2020 | Bogineni ................ H04L 41/12 |
| 2020/0252813 A1* | 8/2020 | Li .......................... H04W 24/08 |
| 2020/0358670 A1 | 11/2020 | Lee et al. |
| 2021/0021494 A1* | 1/2021 | Yao .................... H04L 41/5009 |
| 2021/0022024 A1* | 1/2021 | Yao .................. H04W 36/0085 |
| 2021/0083956 A1* | 3/2021 | Fan ..................... H04L 43/0876 |
| 2021/0144076 A1 | 5/2021 | Lee et al. |
| 2021/0204154 A1* | 7/2021 | Li .......................... H04W 24/08 |
| 2021/0219151 A1* | 7/2021 | Fiorese ................ H04W 24/02 |
| 2021/0306887 A1* | 9/2021 | Kim ...................... H04W 24/08 |
| 2021/0329485 A1* | 10/2021 | Han .................. H04W 28/0236 |
| 2022/0038946 A1* | 2/2022 | Kim .................. H04W 28/0284 |
| 2022/0060397 A1* | 2/2022 | Puente Pestaña ... H04L 47/2441 |
| 2023/0164877 A1* | 5/2023 | Kim ....................... H04W 76/22 370/328 |
| 2023/0318746 A1* | 10/2023 | Kim ....................... H04W 76/22 370/235 |

OTHER PUBLICATIONS

Ericsson, "Alignments and corrections to Non-Public Network functionality", 3GPP TSG-SA WG2 Meeting #136, S2-1911027, Reno, USA, Nov. 18-22, 2019.

Samsung, "Updates to Sol#2 on support for slice SLA guarantee", 3GPP TSG-SA2 Meeting #139E, S2-2004544, Elbonia, Jun. 1-12, 2020.

Nokia et al., "Mega CR to clean up", 3GPP TSG-SA2 Meeting #142E, S2-2009068, Online, Nov. 16-20, 2020.

* cited by examiner

METHOD AND APPARATUS FOR SUPPORTING SERVICE CONTINUITY IN NPN USING NWDAF

CROSS-REFERENCE TO RELATED APPLICATIONS

This application claims priority to and the benefit of Korean Patent Application No. 10-2021-0044862 filed in the Korean Intellectual Property Office on Apr. 6, 2021, and Korean Patent Application No. 10-2022-0043045 filed in the Korean Intellectual Property Office on Apr. 6, 2022, the entire contents of which are incorporated herein by reference.

BACKGROUND OF THE INVENTION

1. Field of the Invention

This description relates to a method and apparatus for supporting service continuity in a non-public network (NPN) using a network data analytics function (NWDAF).

2. Description of Related Art

When user equipment (UE) moves between a public network and a non-public network, service continuity for third generation partnership project (3GPP) access without interruption needs to be supported.

The above information disclosed in this Background section is only for enhancement of understanding of the background of the invention, and therefore it may contain information that does not form the prior art that is already known in this country to a person of ordinary skill in the art.

SUMMARY OF THE INVENTION

An embodiment provides a method for supporting service continuity between networks.

Another embodiment provides an apparatus for supporting service continuity between networks.

According to an embodiment, a method for supporting service continuity between a first network and a second network is provided. In such an embodiment, the method includes: requesting slice analytics for selection of a slice from a network data analytics function (NWDAF) of the first network before a terminal moves from the first network to the second network; and selecting a slice to be used in the second network to provide a service to the terminal based on the slice analytics received from the NWDAF of the first network.

In such an embodiment, the method may further include receiving a registration request from the terminal using non-3GPP access, wherein the registration request includes slice information in the first network.

In an embodiment, the slice analytics may be determined based on the slice information in the first network and an identifier of the second network.

In such an embodiment, the method may further include establishing a protocol data unit (PDU) session with the second network using the non-3GPP access.

In such an embodiment, the method may further include handing over the PDU session from the non-3GPP access to 3GPP access.

In an embodiment, the first network may be a standalone non-public network (SNPN) and the second network may be a public land mobile network (PLMN).

In such an embodiment, the method may further include receiving a registration request from the terminal using 3GPP access, wherein the registration request includes slice information in the first network.

In such an embodiment, the method may further include establishing a PDU session with the second network using the non-3GPP access.

In such an embodiment, the method may further include handing over the PDU session from the non-3GPP access to 3GPP access after selecting the slice to be used in the second network.

According to another embodiment, an apparatus for supporting service continuity between a first network and a second network is provided. The apparatus includes: a processor, a memory, and a communication device, wherein the processor executes a program stored in the memory to perform: requesting slice analytics for selection of a slice from a network data analytics function (NWDAF) of the first network before a terminal moves from the first network to the second network; and selecting a slice to be used in the second network to provide a service to the terminal based on the slice analytics received from the NWDAF of the first network.

In an embodiment, the processor may execute the program to further perform receiving a registration request from the terminal using non-3GPP access, and the registration request may include slice information in the first network.

In an embodiment, the slice analytics may be determined based on the slice information in the first network and an identifier of the second network.

In an embodiment, the processor may execute the program to further perform establishing a PDU session with the second network using the non-3GPP access.

In an embodiment, the processor may execute the program to further perform handing over the PDU session from the non-3GPP access to 3GPP access.

In an embodiment, the first network may be an SNPN and the second network may be a PLMN.

In an embodiment, the processor may execute the program to further perform receiving a registration request from the terminal using 3GPP access, and the registration request may include slice information in the first network.

In an embodiment, the processor may execute the program to further perform establishing a PDU session with the second network using the non-3GPP access. In an embodiment, the processor may execute the program to further perform handing over the PDU session from the non-3GPP access to 3GPP access after selecting the slice to be used in the second network.

DETAILED DESCRIPTION OF THE EMBODIMENTS

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, user equipment may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, expressions described in singular can be interpreted as singular or plural unless explicit expressions such as "one" or "single" are used.

A wireless communication system according to an embodiment may be applied to various wireless communication networks. For example, the wireless communication system may be applied to a current wireless access technology (radio access technology, RAT)-based wireless communication network or 5G and later wireless communication networks. 3GPP is developing a new RAT-based 5G standard that meets the IMT-2020 requirements, and this new RAT is called NR (New Radio). Here, for convenience of description, an NR-based wireless communication system will be described as an example, but the embodiment is not limited thereto and may be applied to various wireless communication systems.

Figure 1:
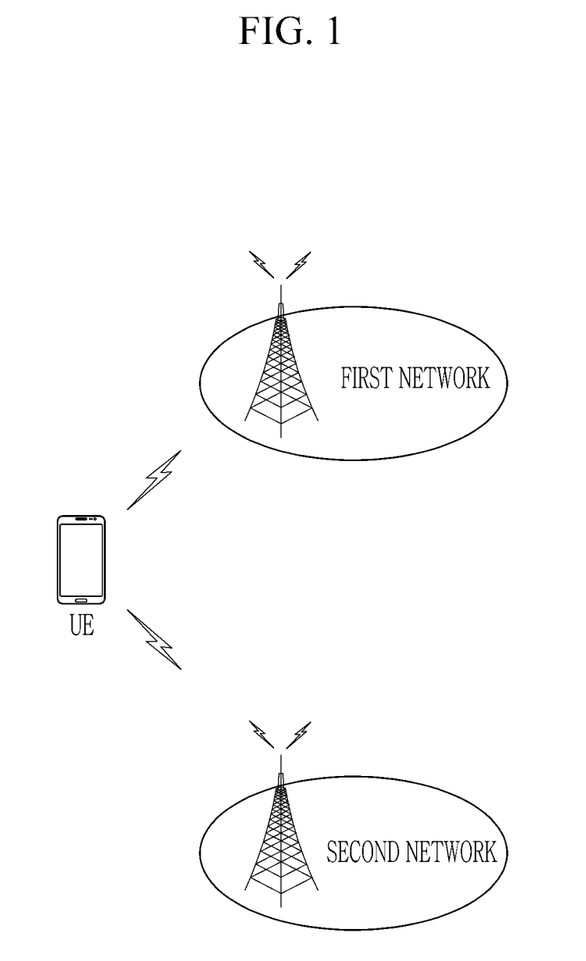
FIG. 1 is a schematic diagram illustrating a wireless communication system according to an embodiment.

FIG. 1 is a schematic diagram illustrating a wireless communication system according to an embodiment.

Referring to FIG. 1, when a UE 100 moves between a NPN 200 and a PLMN 300, a network slice that provided service to the UE 100 in the previous network of the UE 100 needs to be continued in the next network without interruption.

The NPN may be a PNI NPN (Public Network Integrated NPN) or a SNPN (Stand-alone NPN), and since a part described as the NPN in this description represents only one example, the NPN may be understood as the SNPN or the PNI NPN.

The UE 100 according to an embodiment may establish a PDU session with NPN 200 (NPN PDU session) using 3GPP access, and then 1) preliminarily activate non-3GPP access, or 2) activate the non-3GPP access according to determination of the UE 100, or 3) activate the non-3GPP access according to determination of an access and mobility management function (AMF) in the NPN 200.

The UE 100 according to an embodiment may establish the PDU session with the NPN 200 using the 3GPP access and may preliminarily activate the non-3GPP access. That is, when the UE 100 is connected to the NPN 200 using the 3GPP access, the UE 100 may activate the non-3GPP access without an explicit trigger and establish a PDU session with the PLMN 300 (a PLMN PDU session) using the activated non-3GPP access.

Alternatively, after the UE 100 establishes the PDU session with the NPN 200 using the 3GPP access, the UE 100 may determine the need to activate the non-3GPP access based on parameters related to the wireless environment with a radio access network (RAN) of the NPN 200 (e.g., Reference Signal Received Power (RSRP) or reference signal reception quality (RSRQ)). For example, if the UE 100 determines that the wireless environment with the RAN of the NPN 200 is not good based on the parameters, the UE 100 may activate the non-3GPP access for connection with the PLMN 300 and establish the PDU session with the PLMN 300 (PLMN PDU session) by using the activated non-3GPP access.

Alternatively, after the UE 100 establishes the PDU session with the SNPN 200 by using the 3GPP access, the AMF of the SNPN 200 may instruct the UE 100 to activate the non-3GPP access based on UE analytics for the UE 100 generated by a network data analytics function (NWDAF) of the SNPN 200.

Then, the access of the PLMN PDU session may be moved from the non-3GPP access to the 3GPP access through handover or user plane switching of the UE 100.

Figure 2:
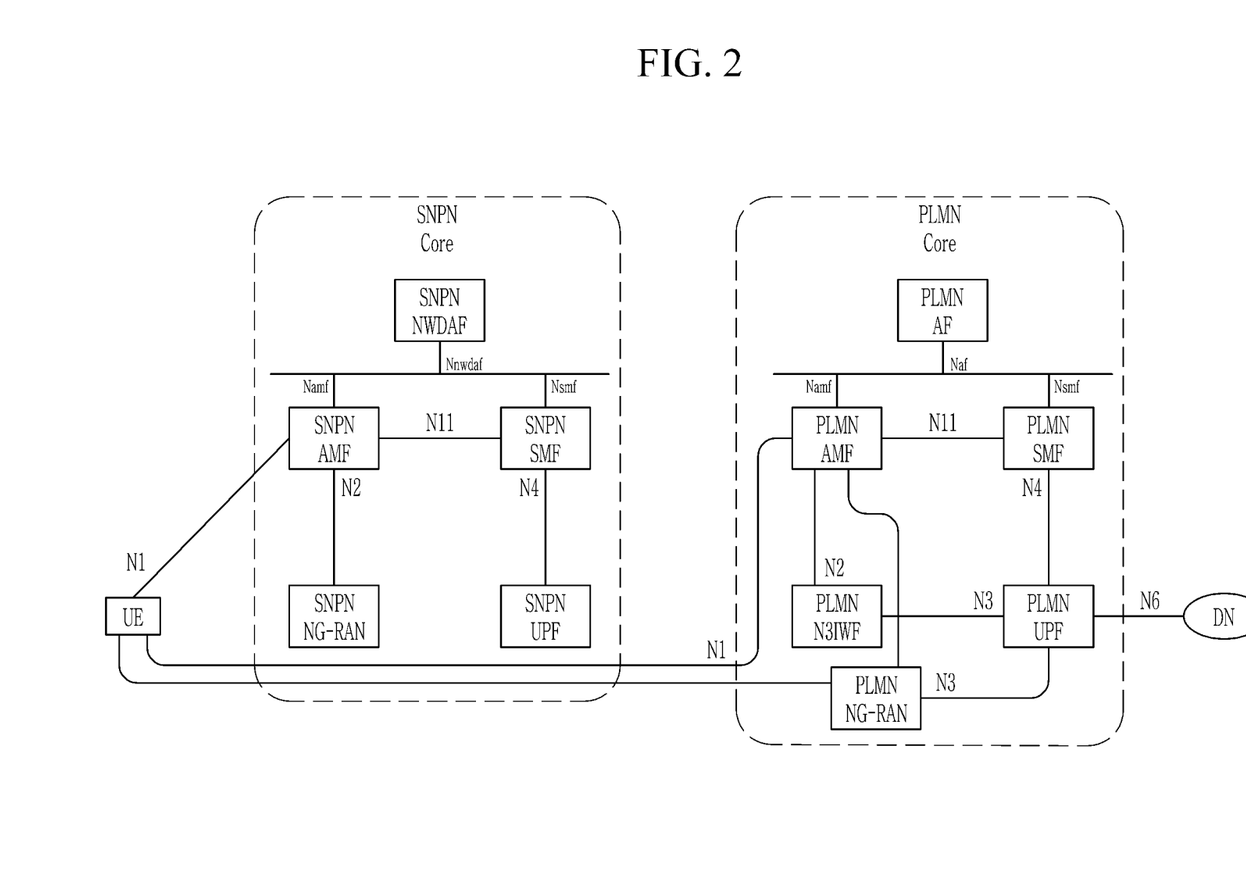
FIG. 2 is a block diagram illustrating a wireless communication system according to an embodiment.
Figure 3:
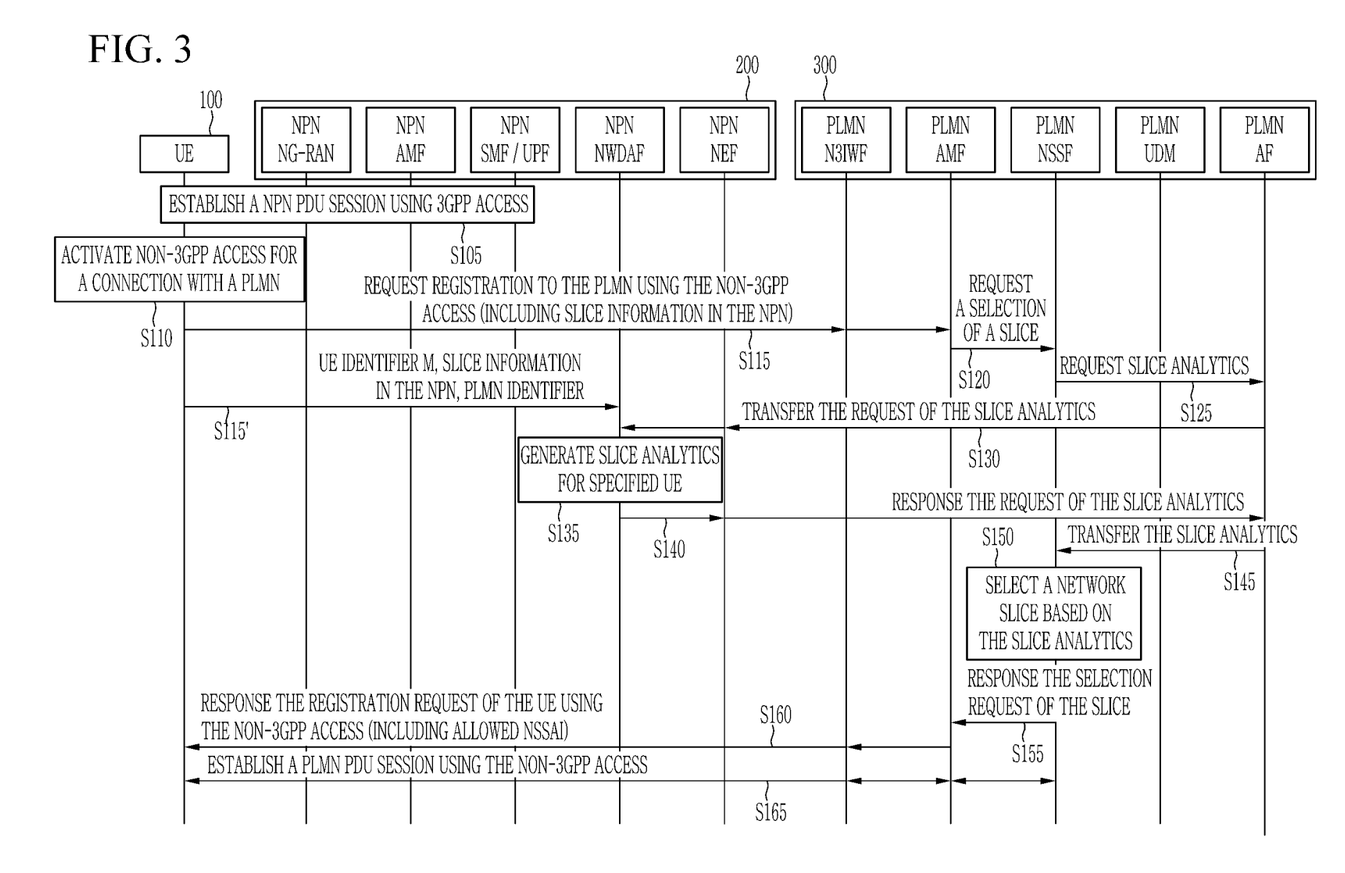
FIG. 3 is a flowchart illustrating a method for supporting service continuity when the UE moves from NPN to PLMN according to an embodiment.

FIG. 2 is a block diagram illustrating a wireless communication system according to an embodiment and FIG. 3 is a flowchart illustrating a method for supporting service continuity when the UE moves from NPN to the PLMN according to an embodiment.

Referring to FIG. 3, the UE 100 may establish a PDU session with the NPN 200 (NPN PDU session) by using the 3GPP access (S105). Then, the UE 100 may activate the non-3GPP access for connection with the PLMN 300 (S110). The UE 100 may activate the non-3GPP access to connect to the PLMN 300 according to the determination of the UE 100 itself or instruction from another entity (e.g., AMF of NPN 200, etc.).

The UE 100 connected to the NPN 200 may determine by itself to access the PLMN 300 or the AMF of the NPN 200 may instruct the UE connected to the NPN 200 to access the PLMN 300. That is, the moving of the UE 100 from the NPN 200 to the PLMN 300 may be determined by the UE 100 or may follow the instruction of the AMF of the NPN 200 or the like. In order for the UE 100 to determine itself to move to the PLMN 300, the UE 100 may measure signal strength, signal quality, etc. from a network other than the connected NPN 200. In order for the AMF of the NPN 200 to determine the movement of the UE 100, the AMF of the NPN 200 may monitor the position, speed, etc. of the UE 100.

The AMF of NPN 200 may generate activation signaling using the location of the UE 100, network deployment, service level agreement (SLA), and so on, and may instruct the UE 100 on activation of the non-3GPP access using the activation signaling. The activation signaling may include action information of the UE 100 for connecting to the PLMN 300, wherein the action information may include parameters such as registration, PDU session establishment, a target network identifier, an access type, a session and service continuity (SSC) mode, and an area in which the UE 100 is located (applicable area for UE action).

The UE 100 that has activated the non-3GPP access may request registration to the non-3GPP interworking function (N3IWF) of the PLMN 300 by using the non-3GPP access (S115).

The registration request message transmitted by the UE 100 to the PLMN 300 by using the non-3GPP access may include an identifier of the UE 100 (e.g., SUPI (SUbscriber Permanent Identifier), SUCI (SUbscriber Concealed Identifier), IMSI (International Mobile Subscriber Identity), IMEI (International Mobile Equipment Identity), etc.). In addition, the registration request message may further include information about the network slice used by the UE 100 in the NPN 200 (past network slice). In this case, the information about the network slice may include required network slice selection assistance information (NSSAI), and the required NSSAI may be a set of single NSSAI (S-NSSAI), and the S-NASSI may be mapping information between an application desired by the UE 100 and the network slices. The S-NSSAI may include slice/service type (SST), and may further include slice differentiator (SD).

The AMF of the PLMN 300 may request a network slice selection function (NSSF) of the PLMN 300 to select a network slice for the UE 100 based on the registration request message received from the UE 100 (S120). Then, the NSSF of the PLMN 300 may request analytics of the past network slice of the UE 100 from the NWDAF of the NPN 200 through the AF of the PLMN 300 to identify information about the past network slice of the UE 100 (S125).

The request for the analytics of the past network slice of the UE 100, transferred by the NSSF of the PLMN 300, may be transferred to the NWDAF of the NPN 200 by the network exposure function (NEF) of the NPN 200 (S130). The NWDAF of the NPN 200 may generate the analytics of the past network slices based on the information about the past network slices of the UE 100 (S135). The analytics of the past network slice of the UE 100 may include information on quality of service (QOS), key performance indicator (KPI), etc. provided by the past network slice of the UE 100.

When the UE 100 according to an embodiment transmits the registration request message to the PLMN 300 using the non-3GPP access, the UE identifier, information about the past network slice, and a PLMN identifier of the PLMN 300 to be connected by using the non-3GPP access in the registration request message may be transmitted to the NWDAF of the NPN 200 (S115'). In this case, steps S125 and S130 may not be performed, and the NWDAF of the NPN 200 may generate the analytics about the network slice used by the UE 100 based on information about the past network slice and the UE identifier received from the UE 100. Then, the generated analytics of the network slice may be directly transmitted to the PLMN 300 corresponding to the PLMN identifier. Afterwards, the NWDAF of the NPN 200 may transfer to the PLMN 300 the analytics of the past network slice of the UE 100 via the NEF of the NPN 200 (S140), and the AF of the PLMN 300 may transfer the analytics of the past network slice of the UE 100 generated by the NWDAF of the NPN 200 to the NSSF of the PLMN 300 (S145).

Then, the NSSF of the PLMN 300 may select a network slice for the UE 100 that has transmitted the registration request message through the non-3GPP access based on the analytics of the past network slice of the UE 100 (S150). The NSSF of the PLMN 300 may transfer a response (response to the selection request of the network slice) including information about the selected network slice (e.g., allowed NSSAI) to the AMF of the PLMN 300 (S155). The AMF of the PLMN 300 may transmit a response to the registration request to the UE 100 by using the non-3GPP access (S160), where the response to the registration request of the UE 100 may include information about the selected network slice. Then, the UE 100 may establish a PLMN PDU session using the non-3GPP access (S165).

Figure 4:
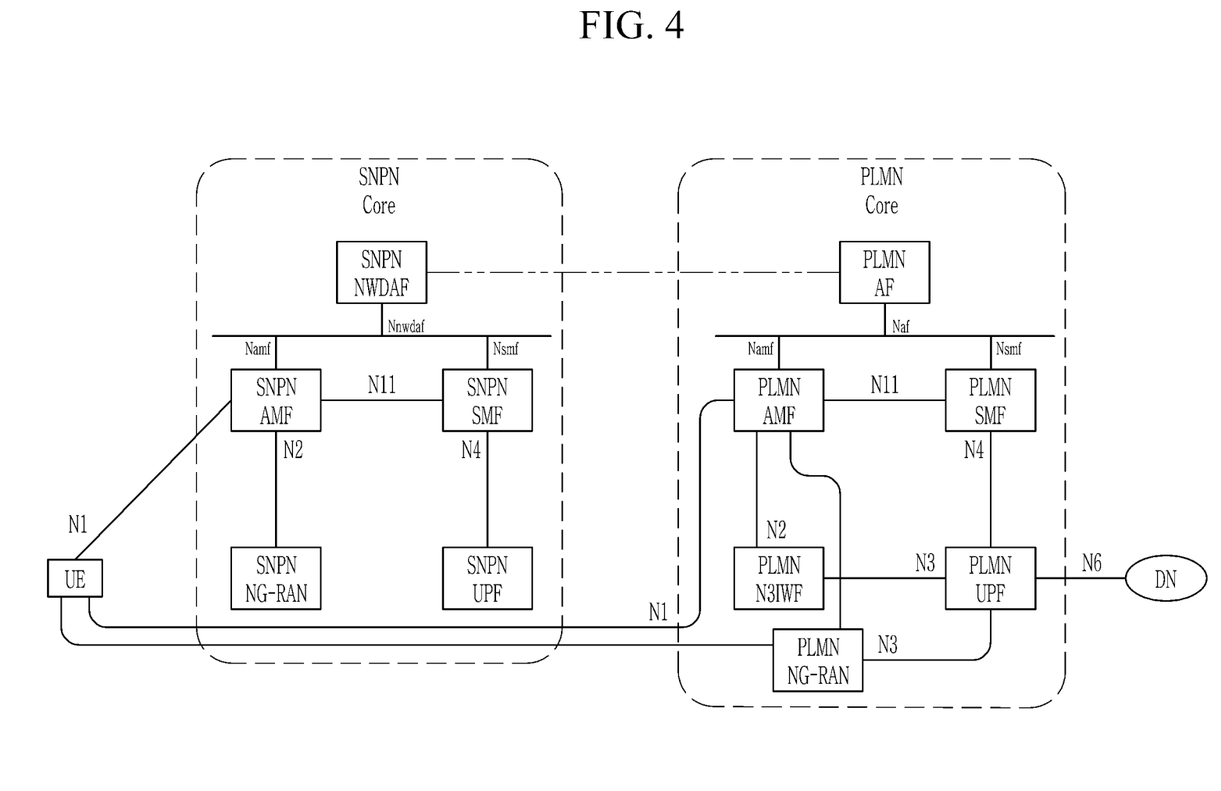
FIG. 4 is a block diagram illustrating a wireless communication system according to another embodiment.
Figure 5:
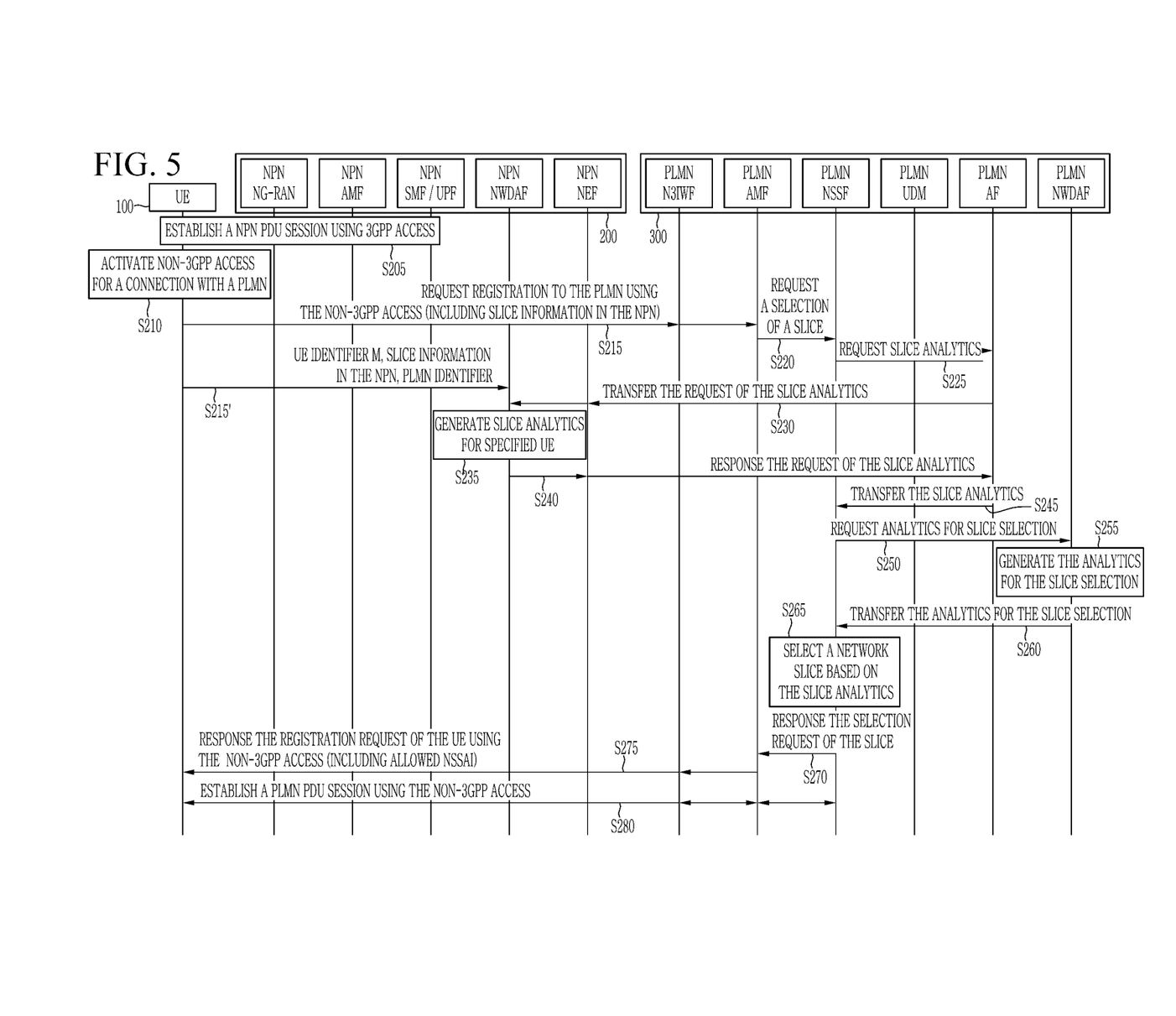
FIG. 5 is a flowchart illustrating a method for supporting service continuity when the UE moves from NPN to PLMN according to another embodiment.

FIG. 4 is a block diagram illustrating a wireless communication system according to another embodiment and FIG. 5 is a flowchart illustrating a method for supporting service continuity when the UE moves from NPN to PLMN according to another embodiment.

Referring to FIG. 5, UE 100 may establish a PDU session (NPN PDU session) with NPN 200 and by using 3GPP access (S205). Then, the UE 100 may activate non-3GPP access for connection with PLMN 300 (S210). The UE 100 may activate the non-3GPP access to connect to the PLMN 300 according to determination of the UE 100 itself or an instruction from another entity (e.g., AMF of the NPN 200, etc.).

The UE 100 connected to the NPN 200 may determine by itself to access the PLMN 300 or the AMF of the NPN 200 may instruct the UE connected to the NPN 200 to access the PLMN 300. The decision of the UE 100 to move from the NPN 200 to the PLMN 300 may be referred to the description in FIG. 3.

The UE 100 that has activated the non-3GPP access may request registration to the non-3GPP interworking function (N3IWF) of the PLMN 300 using the non-3GPP access (S215).

A registration request message transmitted by the UE 100 to the PLMN 300 by using the non-3GPP access may include an identifier of the UE 100 (e.g., SUPI (SUbscriber Permanent Identifier), SUCI (SUbscriber Concealed Identifier), IMSI (International Mobile Subscriber Identity), IMEI (International Mobile Equipment Identity), etc.).

In addition, the registration request message may further include information about the network slice used by the UE 100 in the NPN 200 (past network slice). In this case, the information about the network slice may include required network slice selection assistance information (NSSAI), the required NSSAI may be a set of single NSSAI (S-NSSAI), and the S-NASSI may be mapping information between an application desired by the UE 100 and network slices. The S-NSSAI may include Slice/Service Type (SST), and may further include Slice Differentiator (SD).

The AMF of the PLMN 300 may request the network slice selection function (NSSF) of the PLMN 300 to select a network slice for the UE 100 based on the registration request message received from the UE 100 (S220). Then, the NSSF of the PLMN 300 may request analytics of the past network slice of the UE 100 from the NWDAF of the NPN 200 through the AF of the PLMN 300 in order to identify information about the past network slice of the UE 100 (S225).

The request for the analytics of the past network slice of the UE 100, transferred by the NSSF of the PLMN 300, may be transferred to the NWDAF of the NPN 200 by the network exposure function (NEF) of the NPN 200 (S230). The NWDAF of the NPN 200 may generate the analytics of the past network slice based on the information about the past network slice of the UE 100 (S235). The analytics of the past network slice of the UE 100 may include information on a key performance indicator (KPI), quality of service (QOS) provided by the past network slice of the UE 100.

When the UE 100 according to an embodiment transmits a registration request message to the PLMN 300 using the non-3GPP access, the UE identifier, information about the past network slice, and a PLMN identifier of the PLMN 300 to be connected by using the non-3GPP access in the registration request message may be transferred to the NWDAF of the NPN 200. The NWDAF of the NPN 200 may generate analytics about the network slice used by the UE 100 based on the UE identifier received from the UE 100 and information about the past network slice and transmit the generated analytics of the network slice to the PLMN 300 corresponding to the PLMN identifier. Then, the NWDAF of the NPN 200 may transfer the analytics of the past network slice of UE 100 to the PLMN 300 via the NEF of the NPN 200 (S240), and the AF of the PLMN 300 may transfer the analytics of the past network slice of UE 100 generated by the NWDAF of the NPN 200 to the NSSF of the PLMN 300 (S245).

The NSSF of the PLMN 300 may request the analytics for selecting a slice to be allocated to the UE 100 while transferring the analytics of the past network slice of the UE 100 to the NWDAF of the PLMN 300 (S250). The NWDAF of the PLMN 300 may generate analytics for selection of a slice (S255) and may transmit the generated analytics to the NSSF of the PLMN 300 (S260).

When an interface is established between the NWDAF of the NPN 200 and the NWDAF of the PLMN 300, the analytics of the past network slices generated by the NWDAF of the NPN 200 may be directly transmitted to the NWDAF of the PLMN 300. The NWDAF of the PLMN 300 may generate analytics for selecting a network slice for the UE 100 based on the analytics of the past network slice received from the NWDAF of the NPN 200, and the analytics for the selection of the network slice may be transmitted to the NSSF of the PLMN 300.

When the UE 100 according to another embodiment transmits the registration request message to the PLMN 300 using the non-3GPP access, the UE identifier, the information about the past network slice, and the PLMN identifier of the PLMN 300 to be connected by using the non-3GPP access in the registration request message may be transmitted to the NWDAF of the NPN 200 (S215'). In this case, steps S225 and S230 may be not performed, and the NWDAF of the NPN 200 may generate analytics about the network slice used by the UE 100 based on the information about the past network slice and the UE identifier received from the UE 100. Then, the generated analytics of the network slice may be directly transmitted to the PLMN 300 corresponding to the PLMN identifier. At this time, if an interface is established between the NWDAF of the NPN 200 and the NWDAF of the PLMN 300, the analytics of the past network slice generated by the NWDAF of the NPN 200 may be directly transmitted to the NWDAF of the PLMN 300.

The NSSF of the PLMN 300 may select a network slice for the UE 100 that transmits the registration request message through the non-3GPP access based on the analytics for the past network slice received from the NWDAF of the NPN 200 and the analytics for the slice selection received from the NWDAF of the PLMN 300 (S265).

The NSSF of the PLMN 300 may transfer a response (response to the selection request of the network slice) including information about the selected network slice (e.g., allowed NSSAI) to the AMF of the PLMN 300 (S270). The AMF of the PLMN 300 may transmit a response to the registration request to the UE 100 by using the non-3GPP access (S275), where the response to the registration request of the UE 100 may include information about the selected network slice. Then, the UE 100 may establish a PLMN PDU session by using the non-3GPP access (S280).

Figure 6:
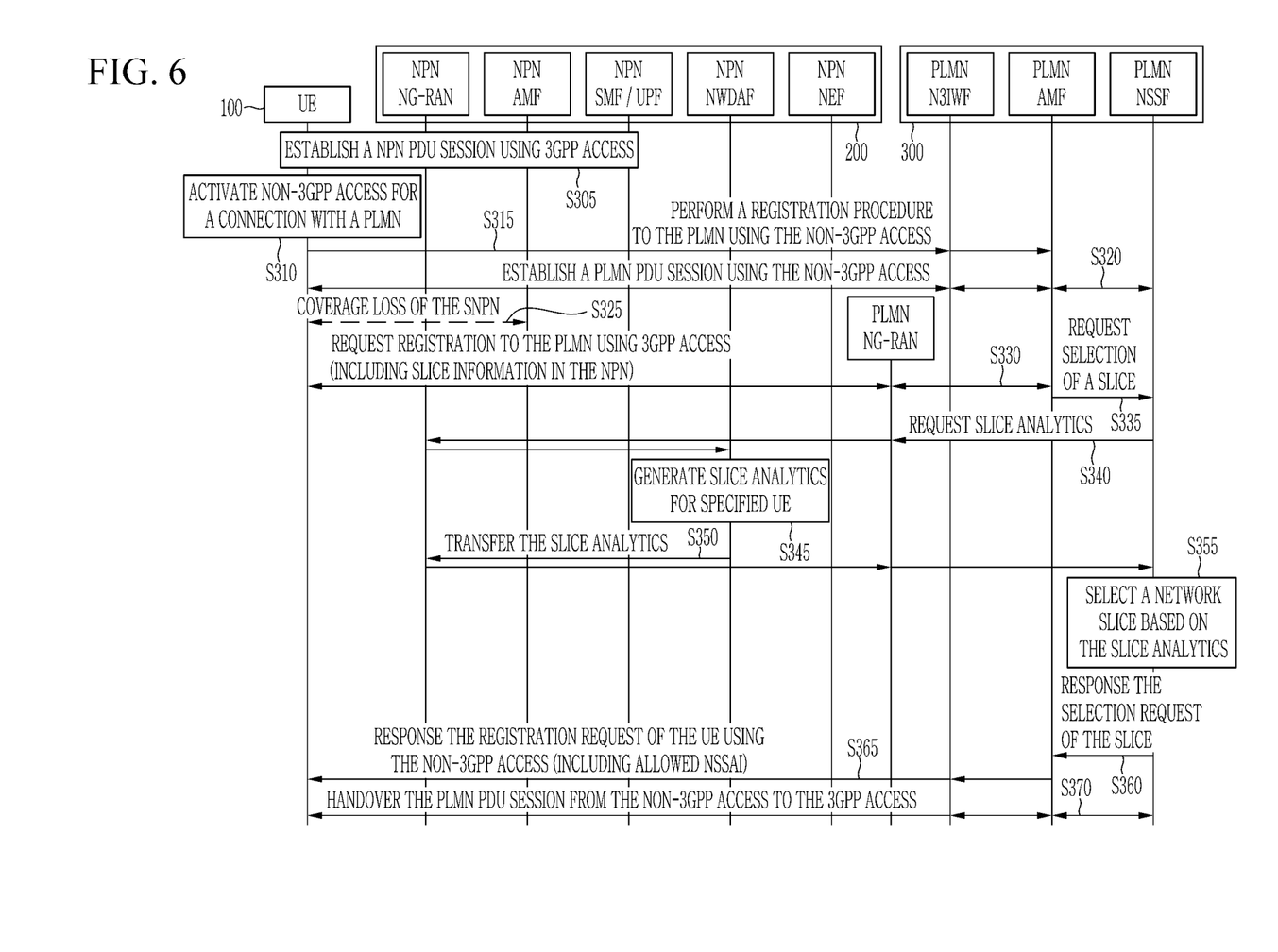
FIG. 6 is a flowchart illustrating a method for supporting service continuity when the UE moves from NPN to PLMN according to yet another embodiment.

FIG. 6 is a flowchart illustrating a method for supporting service continuity when the UE moves from NPN to PLMN according to yet another embodiment.

Referring to FIG. 6, UE 100 may transmit a registration request message to an NG-RAN of PLMN 300 by using 3GPP access after establishing a PDU session with the PLMN 300 by using the non-3GPP access (S330). In this case, the registration request message may include a UE identifier and information about a past network slice of the UE. Then, through steps S335 to S350, the analytics of the past network slice may be generated by the NWDAF of the NPN 200 and the analytics of the past network slice may be transmitted to the NSSF of the PLMN 300.

Then, the NSSF of the PLMN 300 may determine a network slice for the UE 100 based on the analytics of the past network slice of the UE 100 generated by the NWDAF of the NPN 200 and transmit information about the determined network slice (e.g., allowed NSSAI) to the UE 100 through an AMF. The UE may establish a PDU session with the PLMN 300 through the 3GPP access based on the information about the network slice allowed in the PLMN 300.

According to another embodiment, the UE 100 may transmit the UE identifier and the information about the past network slices of the UE together with the identifier of the PLMN 300 to the NWDAF of the NPN 200 in advance. After establishing the PLMN PDU by using the non-3GPP access in S320, or before or after the loss of the NPN coverage, or together with S330, UE 100 may transmit the UE identifier and information about the past network slice to the NWDAF of the NPN 200 or the AMF of the PLMN 300.

Then, the NPN 200 may generate analytics of the past network slice of the UE 100 based on the UE identifier and information about the past network slice and transmit the generated analytics of the past network slice to the PLMN 300 corresponding to the received identifier of the PLMN 300. In this case, the procedure for the NSSF of the PLMN 300 to request and receive the analytics of the past network slice from the NWDAF of the NPN 200 may not be performed.

Although not shown in FIG. 6, the NSSF of the PLMN 300 may transfer the analytics of the past network slice of the UE 100 generated by the NWDAF of the NPN 200 to the NWDAF of the PLMN 300, and the NWDAF of the PLMN 300 may generate analytics for selecting a network slice for the UE 100 based on the information of the past network slice of the UE 100. Alternatively, the analytics of the past network slice of the UE 100 generated by the NWDAF of the NPN 200 may be directly transmitted to the NWDAF of the PLMN 300 through an interface between the NWDAF of the PLMN 300 and the NWDAF of the NPN 200.

In another embodiment, the NSSF of the PLMN 300 may select a network slice for the UE 100 based on the analytics for selection of the network slice from the NWDAF of the PLMN 300 and the analytics of the past network slice from the NWDAF of the NPN 200.

Although the case in which the UE moves from the NPN 200 to the PLMN 300 is used as an example above, the present description is not limited thereto, and even when the UE moves from the PLMN 300 to the NPN 200, the method for supporting service continuity of the present description may be applied.

As described above, for a UE moving between the PLMN and the NPN or between the NPNs, a network slice can be seamlessly selected and provided.

Figure 7:
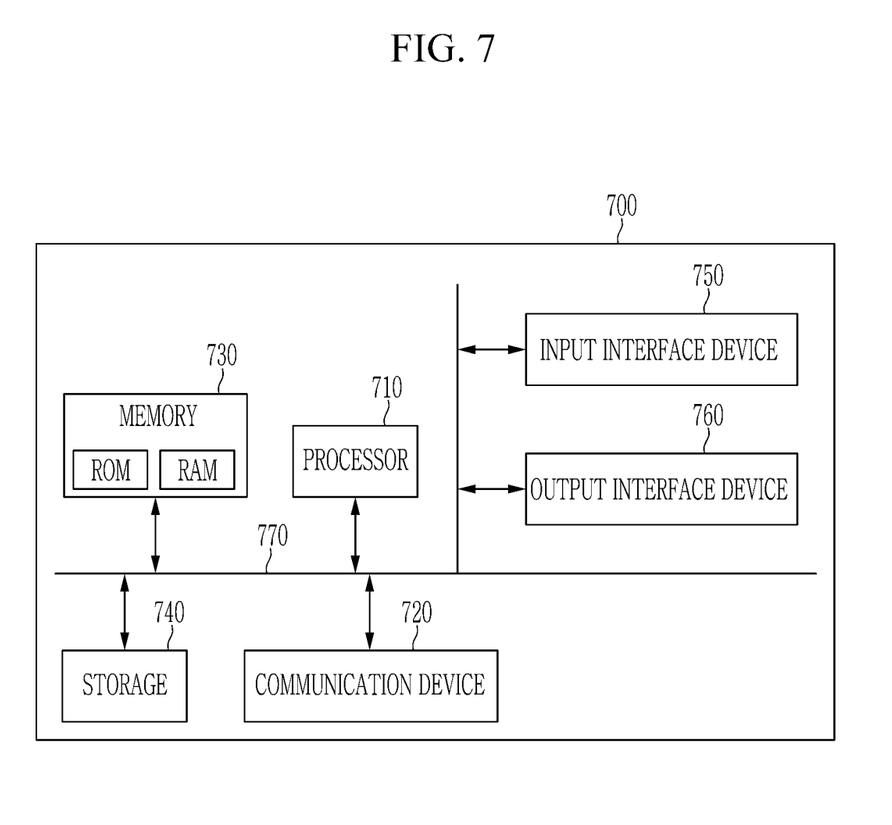
FIG. 7 is a block diagram illustrating a UE and a network device according to an embodiment.

FIG. 7 is a block diagram illustrating a UE and a network device according to an embodiment.

The network device according to an embodiment may be the above-described RAN, AMF, session management function (SMF), or NWDAF, and may be implemented in a computer system, for example, a computer-readable medium. Referring to FIG. 7, the computer system 700 may include at least one of a processor 710, a memory 730, an input interface device 750, an output interface device 760, and a storage device 740 communicating through a bus 770. The computer system 700 may also include a communication device 720 coupled to the network. The processor 710 may be a central processing unit (CPU) or a semiconductor device that executes instructions stored in the memory 730 or the storage device 740. The memory 730 and the storage device 740 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 720 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

Although the embodiment has been described in detail above, the scope of this description is not limited thereto, and various modifications and improved forms of a person of ordinary skill in the art using the basic concept defined in the following claims also belong to the scope of this description.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for operating a network device supporting service continuity between a first network and a second network, the method comprising:
   requesting slice analytics for selection of a slice from a network data analytics function (NWDAF) of the first network before a terminal moves from the first network to the second network;
   receiving the slice analytics from the NWDAF of the first network; and
   selecting a slice to be used in the second network to provide a service to the terminal among a plurality of slices based on the slice analytics received from the NWDAF of the first network,
   wherein the network device is located within the second network,
   wherein the slice analytics includes information on quality of service (QOS) and key performance indicator (KPI) provided by a network slice.

2. The method of claim 1, further comprising receiving a registration request from the terminal using non-third generation partnership project (3GPP) access to register on the second network,
   wherein the registration request includes slice information in the first network and an identifier of the terminal.

3. The method of claim 2, wherein the slice analytics is determined based on the slice information in the first network and an identifier of the second network.

4. The method of claim 2, further comprising establishing a protocol data unit (PDU) session with the second network using the non-3GPP access.

5. The method of claim 4, further comprising handing over the PDU session from the non-3GPP access to 3GPP access.

6. The method of claim 1, wherein the first network is a standalone non-public network (SNPN) and the second network is a public land mobile network (PLMN).

7. The method of claim 1, further comprising receiving a registration request from the terminal using third generation partnership project (3GPP) access,
   wherein the registration request includes slice information in the first network.

8. The method of claim 7, further comprising establishing a protocol data unit (PDU) session with the second network using the non-3GPP access.

9. The method of claim 8, further comprising handing over the PDU session from the non-3GPP access to 3GPP access after selecting the slice to be used in the second network.

10. A network device for supporting service continuity between a first network and a second network, the network device comprising:
    a processor, a memory, and a communication device, wherein the processor executes a program stored in the memory to:
    request slice analytics for selection of a slice from a network data analytics function (NWDAF) of the first network before a terminal moves from the first network to the second network;
    receive the slice analytics from the NWDAF of the first network; and
    select a slice to be used in the second network to provide a service to the terminal among a plurality of slices based on the slice analytics received from the NWDAF of the first network, wherein the network device is located within the second network, wherein the slice analytics includes information on quality of service (QOS) and key performance indicator (KPI) provided by a network slice.

11. The the network device of claim 10, wherein the processor further executes the program to receive a registration request from the terminal using non-third generation partnership project (3GPP) access to register on the second network, the registration request including slice information in the first network and an identifier of the terminal.

12. The the network device of claim 11, wherein the slice analytics is determined based on the slice information in the first network and an identifier of the second network.

13. The the network device of claim 11, wherein the processor further executes the program to establish a protocol data unit (PDU) session with the second network using the non-3GPP access.

14. The the network device of claim 13, wherein the processor further executes the program to hand over the PDU session from the non-3GPP access to 3GPP access.

15. The the network device of claim 10, wherein the first network is a standalone non-public network (SNPN) and the second network is a public land mobile network (PLMN).

16. The the network device of claim 10, wherein the processor further executes the program to receive a registration request from the terminal using third generation partnership project (3GPP) access, the registration request including slice information in the first network.

17. The the network device of claim 16, wherein the processor further executes the program to establish a protocol data unit (PDU) session with the second network using the non-3GPP access.

18. The the network device of claim 17, wherein the processor further executes the program to hand over the PDU session from the non-3GPP access to 3GPP access after selecting the slice to be used in the second network.

* * * * *